United States Patent
Ahluwalia et al.

(10) Patent No.: US 8,543,539 B2
(45) Date of Patent: Sep. 24, 2013

(54) METHOD AND SYSTEM FOR CAPTURING CHANGE OF DATA

(75) Inventors: Madhu Ahluwalia, Baltimore, MD (US); Alexei Potiagalov, Richmond (CA)

(73) Assignee: Business Objects Software Limited, Dublin (IE)

( * ) Notice: Subject to any disclaimer, the term of this patent is extended or adjusted under 35 U.S.C. 154(b) by 469 days.

(21) Appl. No.: 12/560,422

(22) Filed: Sep. 16, 2009

(65) Prior Publication Data

US 2011/0066593 A1   Mar. 17, 2011

(51) Int. Cl.
*G06F 7/00* (2006.01)
*G06F 17/00* (2006.01)

(52) U.S. Cl.
USPC .......................................... 707/613; 707/614

(58) Field of Classification Search
USPC ................................................. 707/613, 614
See application file for complete search history.

(56) References Cited

U.S. PATENT DOCUMENTS

| | | | | |
|---|---|---|---|---|
| 5,684,984 | A | * | 11/1997 | Jones et al. .................. 707/613 |
| 6,470,329 | B1 | | 10/2002 | Livschitz |
| 6,714,949 | B1 | * | 3/2004 | Frey, Jr. ............................ 707/1 |
| 7,269,701 | B2 | * | 9/2007 | Shackelford et al. ......... 711/162 |
| 7,506,032 | B1 | * | 3/2009 | Ramarao et al. .............. 709/213 |
| 2006/0047855 | A1 | | 3/2006 | Gurevich et al. |

FOREIGN PATENT DOCUMENTS

WO    WO 2007/141125 A1    12/2007

OTHER PUBLICATIONS

Extended European Search Report for EP Application No. 10009721. 1-1225, mailed Jan. 25, 2011, 6 pages; EPO, Rijswijk, Netherlands.
MSDN Library; Master-Subordinate Replication; Microsoft patterns & practices; Jun. 2003; Version 1.0.0; Microsoft Corporation, United States of America (http://msdn.microsoft.com/en-us/library/ms978740.aspx).
Wilburt Juan Labio, Hector Garcia-Molina; Efficient Snapshot Differential Algorithms for Data Warehousing; Proceedings of VLDB Conference 1996; Very Large Data Base Endowment Inc.; Mumbai, India (http://www.vldb.org/conf/1996/P063.PDF).

(Continued)

*Primary Examiner* — Mariela Reyes (57) ABSTRACT

Disclosed are systems and methods for synchronizing data present in a target data set with data present in a source data set. The data present in the target data set is partitioned to determine a partition definition of the target data set. A target message digest is calculated for the data present in each partition of the target data set. Based upon the partition definition of the target data set, the data present in the source data set is partitioned. A source message digest is calculated for the data present in each partition of the source data set. The source message digest of a partition is compared with the target message digest of a corresponding partition to capture a change in data present in the source data set. Based upon the captured data, the data in the target data set is synchronized with the data in the source data set.

20 Claims, 4 Drawing Sheets

(56) References Cited

OTHER PUBLICATIONS

Sudarshan S. Chawathe; Anand Rajaraman; Hector Garcia-Molina; Jennifer Widom; Change detection in hierarchically structured information; International Conference on Management of Data—Proceedings of the 1996 ACM SIGMOD; ACM; Montreal, Quebec, Canada (http://portal.acm.org/citation.cfm?id=233366&dl=GUIDE&coll=GUIDE&CFID=76009393&CFTOKEN=81594417).

Wikipedia; Change data capture; Nov. 13, 2008; Wikipedia; (http://en.wikipedia.org/w/index.php?title=Change_data_capture&oldid=251496862 (accessed Nov. 21, 2008)).

Sanjay Mishra; Capturing Change: Use Change Data Capture to simplify ETL in data warehouse applications; Oracle Magazine—Nov./Dec. 2003; Oracle Corporation, Redwood Shores, California, USA (http://web.archive.org/web/20060619210253/http://www.oracle.com/technology/oramag/oracle/03-nov/o63tech_bi.html (accessed Feb. 8, 2010)).

* cited by examiner

METHOD AND SYSTEM FOR CAPTURING CHANGE OF DATA

TECHNICAL FIELD

Embodiments of the invention generally relate to computer systems, and more particularly to methods and systems for capturing change of data.

BACKGROUND

In current business environment, enterprise data is often moved from virtually any source location into data warehouses or databases so that the changed data can be used to facilitate business practices. This task can create an enormous overhead on the existing resources if an entire volume of data is migrated from the source to the target whenever the source is updated. Change data capture (CDC) is an approach designed to accomplish data migration and data integration efficiently. CDC comprises of tasks to detect, extract, transfer and apply data modification changes. Transactional changes are captured from operational systems and applied to one or more data repository systems. CDC can be implemented in both source and target systems. When CDC is implemented in the source system, it is offered as a feature of the source system, where the source systems use triggers, logs files and other methods to identify the data that has changed since the last extraction. The change data is made available to target systems in a controlled manner.

When CDC is implemented in the target systems, the source system is relieved of providing any CDC service. Reducing the amount of data traffic between source and target databases, while reducing or eliminating the need to for modifications to the schema of the source database may be desirable.

SUMMARY OF THE INVENTION

Embodiments of the invention are generally directed to methods and systems for synchronizing data present in a target data set with data present in a source data set. Data present in the target data set is typically a replica of data that is initially present in the source data set. Data present in the source data set may be subjected to modifications depending upon a business scenario that is associated with the source data set. To execute the synchronization, a change of data in the source data set is captured and the target data set is updated based upon the captured change of data. To capture the change of data present in the source data set, the target data set and the source data set are analyzed. The data present in the target data set is partitioned to determine a partition definition of the target data set. The partition definition of the target data set typically includes information about the data present in each partition of the target data set. A target message digest is calculated for the data present in each partition of the target data set. Based upon the partition definition of the target data set, the data present in the source data set is partitioned. A source message digest is calculated for the data present in each partition of the source data set. The source message digest of a partition is compared with the target message digest of a corresponding partition to determine a deviation in values of the target message digest and the source message digest. The deviation in values is used to capture a change in data present in the source data set. Based upon the captured data, the data in the corresponding partition of the target data set is updated. Thus, the data in the target data set is synchronized with the data in the source data set.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of the invention are generally directed to methods and systems for synchronizing data present in a target data set with data present in a source data set. A data set generally includes a collection of data that may be related to an enterprise. A source data set may be a data set residing at a source location, for instance a source database. A target data set may be a data set residing at a target location, for instance a target data set. A target data set may be a replica of the source data set that is residing in a different location from the source data set. During execution of a business scenario, there may be instances when data in one or more data sets are modified. In an embodiment, other data sets may have to be synchronized with the data set that has been modified. To synchronize the other data sets with this modification, the modified data has to be captured, migrated to the other data sets, and integrated to data present in the other data sets. To perform this synchronization, a change data capture method is utilized, to detect, extract, transfer and apply the data modification to the other data sets.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
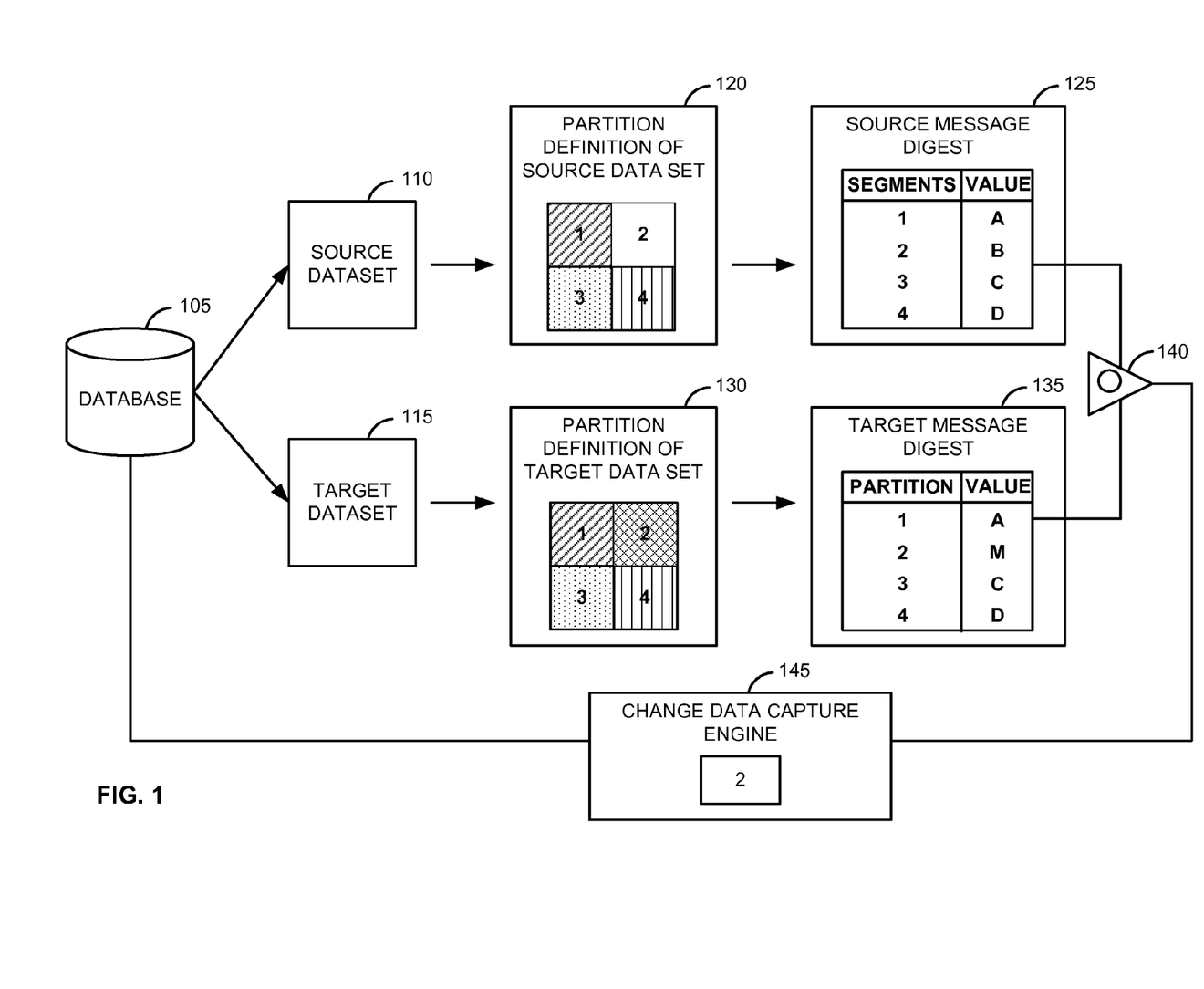
FIG. 1 provides a conceptual illustration for synchronizing data present in a target data set with data present in a source data set, according to one embodiment of the invention.

FIG. 1 provides a conceptual illustration for synchronizing data present in a target data set with data present in a source data set, according to one embodiment of the invention. A data set generally includes a collection of data that may be related to an enterprise, a business scenario, a transaction or the like. The data in the data set may be presented in a tabular format, including one or more tables—each table including one or more rows and one or more columns. The data set may be associated with metadata of the data present in the data set. The metadata of the data set may include a schema of the rows and the columns of the data, where they reside, a name for a set of rows and/or columns, a row and/or a column definition describing the contents of the corresponding row and/or column, indices, keys and the like. The metadata of the data set may be stored in an information repository.

Source data set 110 may be a data set residing at a source location, for instance a source database. Target data set 115 may be a data set residing at a target location, for instance a target database. In an embodiment, source data set 110 and target data set 115 may exist in a common database, for example database 105. In another embodiment, target data set 115 may be a replica of source data set 110 that is residing in a different location from the source data set 110. Metadata of source data set 110 may be utilized to create corresponding target data set 115. In an embodiment, source data set 110 may be represented as a source table, and the metadata of source data set 110 may be represented as a reference table. Based upon the metadata of the source table, a target table may be created. The data in the source table may be downloaded and imported to the target table.

During execution of a business scenario, there may be instances when data in source data set 110 is modified. In an embodiment, the data in target data set 115 may have to be synchronized with the modified data in source data set 110. To synchronize source data set 110 and target data set 115, a change of data in source data set 110 has to be identified, and a corresponding change in target data set 115 has to be performed. To identify the change of data in source data set 110, source data set 110 and target data set are analyzed. Based upon the data present in target data set 115, partition definition 130 of target data set 115 is determined. Partition definition 130 of target data set 115 is determined by partitioning the data present in target data set 115. Partition definition 130 includes information about the data present in each partition of target data set 115, for instance, partitioning information of target data set 115. Partitioning definition may be calculated for each partition of the target database. Partition definition 130 represents a collection of data in target data set 115, and may include an identifier to identify the partition and the data contained therein. The exemplary partition definition 130 of target data set 115 may represent four partitions (for example 1, 2, 3, 4), with each partition including data of a different type.

The partitions of a data set (for example target data set 115) may each contain a group of data, defined by a boundary. For instance, in a target table contained in target data set 115, the partitions may include a set of one or more rows. Each row of the target table may be identified by a row identifier. A partition definition includes metadata on the boundaries of the data in the partition. For example, a partition may include details of the row identifier of the first row and the last row of each partition, and the number of rows in that partition. The row identifier of the first row and the last row of each partition represent a boundary of the data in that partition. For instance, a partition may include a start row and an end row that define the boundary of the partition. In an embodiment, target data set 115 may be partitioned beginning from a row that has a lowest value for the row identifier. The value of the identifier may represent occurrence of the row in the data set. For instance, if the value of a row identifier is R7, the corresponding row occurs in the seventh row in the data set. Thus, the first partition begins from the first row available in the data set. The following partition begins from the row that is succeeding the last row in the previous partition. This is to ensure that all the rows are included in the partitions. In an embodiment, the partition definition may infer metadata on the boundaries of the data in the partition. For instance, the last row of one partition may be inferred from the first row of the subsequent partition.

In an embodiment, partition definition 130 of target data set 115 includes a partition definition table for target data set 115 that stores information related to the partitions of target data set 115, for instance the row identifiers of each partition created for target data set 115. The following table, Table 1, illustrates an exemplary partition definition table, including a collection of data for various partitions.

TABLE 1

Partition Definition Table

| Partition | Target Partition Definition |
|---|---|
| P1 | TPI1 = R1-R9 |
| P2 | TPI2 = R10-R30 |
| P3 | TPI3 = R31-R46 |
| P4 | TPI4 = R47-R70 |
| P5 | TPI5 = R71-R99 |

For instance, Partition P1 of the partition definition table 'Table 1' includes target partition information TPI1. The target partition definition includes row identifier R1 of first row and row identifier R9 last row in that partition P1. Row identifiers R1 and R9 define the boundary of partition P1. Thus, target partition information TPI1 of partition P1 includes the data present between the rows R1 and R9.

Target message digest 135 is calculated for target partition definition 130. A message digest may be designed as a value that is programmatically generated for a collection of data and may represent the corresponding data. In an embodiment, size of the collection of data may vary, and the message digest that is generated for the corresponding collection of data may be a constant. Message digest is generally used to identify any modification that may be made to a collection of data that may have occurred during an execution of a program. The message digest may be determined using, but is not limited to, a cyclic redundancy check algorithm (CRC-32), a checksum algorithm (MD5sum), a Integrity Primitives Evaluation Message Digest (RIPEMS-160), a cryptographic hash function (HAVAL, SHA-1), and the like. The numeral next to the algorithm name specifies a bit-length of the message digest that is generated. For instance, CRC-32 produces a 2^32 values of the message digest.

Target message digest 135 may be a value that is programmatically generated for data present in each partitions of target data set 115. For instance, a value of a target message digest may be generated for the data present in the partition P1 in the partition definition table, 'Table 1'. Typically, for a collection of data, a message digest is generated based upon the data present in the collection. Hence, if the data present in the collection is modified, the message digest may be updated (or modified) based upon the modification performed on the collection of data. In an embodiment, target message digest 135 is used to detect any modification or deviation of data in a data set.

In an embodiment, a message value or a hash is calculated for each row of each partition of the data set. Further, based upon the message values of all the rows of one partition, a message digest is calculated for the corresponding partition. The message value may be generated based upon the data present in each of the rows. Hence, if the data present in the row is modified, the message value of the corresponding row is correspondingly modified. Thus, the message value may be used to detect any deviation in the data present in each row of the data set.

Based upon partition definition 130 of target data set 115, the data present in source data set 110 is partitioned. Partition definition 120 of source data set 110 stores information related to the partitions of source data set 110. Partition definition 120 of source data set 110 may represent four partitions (for example 1, 2, 3, 4), with each partition including data of a different value. Partition definition 120 may represent the data of source data set 110 that has been modified during execution of a business scenario. Thus, there may be a difference in the data contained in the partitions of source data set 110 (for example 120) and partitions of target data set 115 (for example 130). For instance, partition 2 described in partition definition 120 of the source data set 110 has data that is different from partition 2 described in partition definition 130 of target data set 115. Source message digest 125 is calculated for data present in the source data set 110. For example, from the data in each of the partitions of source data set 110, represented by element 120. Since target message digest 135 is calculated based upon the data present in each partition, the value of source message digest 125 for partition 2 in partition definition 120 of source data set 110 is different from the value of target message digest 135 for partition 2 in partition definition 130 of target data set 130.

In an embodiment, if the change in the data of source data set 110 is significant, a re-partitioning of source data set 110 may be performed, and a corresponding message digest may be calculated for the partitions in source data set 110. For instance, if a partition P1 of source data set 110 initially contained twenty five rows, the corresponding message digest value may be 'X' for the data present in the twenty five rows. During execution of a business process, if fifteen new rows are added to the partition P1 of source data set 110, the data in the partition changes significantly. In addition, if partition P1 of source data set 110 has a limit of accommodating thirty rows, the remaining ten rows may not be included in the partition P1 of source data set 110. To accommodate all the data present in the modified source data set 110, a re-partitioning may be performed, and the remaining rows may be included in another partition, for example a subsequent partition. Hence, depending upon the modification that has occurred in each of the partitions of source data set 110, a re-calculation of source message digest 125 for each partition of source data set 110 occurs. Based upon a change in the value of source message digest 125, the deviation in the data present in the corresponding partitions of source data set 110 may be determined. In an embodiment, data may be added to source data set 110 such that the new data precedes the first partition and/or succeeds the last partition in source data set 110. In an embodiment, the first partition of source data set 110 has an open boundary for the first row of the first partition of source data set 110. The open boundary is a start row that can be updated to accommodate data being pre-pended to the partition of source data set 110. In another embodiment, the last partition of source data set 110 has an open boundary for the last row of the partition of data set 110. Here, the open boundary may accommodate data being appended to the partition of source data set 110.

In another embodiment, a partition of source data set 110 whose data has changed significantly may be fragmented to more than one partition, depending upon a degree of modification. For instance, if thirty rows are added to partition P1 of source data set 110 that initially had ten rows, P1 may be fragmented to P1a and P1b, with each partition having twenty rows each. Source message digest 125 is calculated for P1a and P1b. In such cases, a re-partitioning and a subsequent re-calculation of source message digest 125 for each partition may not be necessary. The Partition Definition Table, Table 1, may be updated based upon the re-partitioning and/or fragmenting of the partitions. Thus, size of the partitions may be a constant or a variable, and may be determined dynamically. In another embodiment, a partition of source data set 110 whose data has significantly decreased may be consolidated with more than one partition, depending upon a degree of modification.

For the partition definition table 'Table 1' along with partitions determined for source data set 110, a message digest table may be calculated. The following table, Table 2, illustrates an exemplary message digest table calculated for the partition definition table, Table 1.

TABLE 2

Message Digest Table

| Partition | Target Message Digest | Source Message Digest |
|---|---|---|
| P1 | TPI1 = TMD1 | SPI1 = SMD1 |
| P2 | TPI2 = TMD2 | SPI2 = SMD2 |
| P3 | TPI3 = TMD3 | SPI3 = SMD3 |
| P4 | TPI4 = TMD4 | SPI4 = SMD4 |
| P5 | TPI5 = TMD5 | SPI5 = SMD5 |

For instance, for partition P1 with the target partition definition TPI1, a value of a calculated target message digest 135 is TMD1. Similarly, for the source partition definition SPI1 of partition P1, a value of a calculated source message digest 125 is SMD1. As the value of the message digest depends upon the data contained in the corresponding partition, TMD1 and SMD1 may have an identical value. The values of the source message digest SMD1 and the target message digest TMD1 may be a value that is calculated based upon the data present in P1. The value may be numeric or symbolic with a numeric or string encoding. If there is no modification done to the data in source data set 110, the value of the corresponding partition of source message digest 125 and the value of the partition of target message digest 135 are identical. For example, value of SMD1=value of TMD1. If there is a modification done to the data in source data set 110, the partitions of source data set 110 corresponding to the changed data in source data set 110 may have a different value of the source message digest 125 when compared to the value of the target message digest for the corresponding partition in the target data set 115.

To identify a modification or a deviation that has occurred to the data in source data set 110, the values of the source message digest 125 is compared with the corresponding values of the target message digest 135. Comparator 140 may be used to compare the values of source message digest 125 and target message digest 135. Based upon the comparison, the modified data in source data set 110 is captured, and the data in target data set 115 is correspondingly updated with the captured changed data. For instance, with reference to Table 2, the value of SMD1 is compared with the value of TMD1, the value of SMD2 is compared with the value of TMD2, and so on. If the values of the source message digest 125 of one partition of source data set 110 do not match with the value of the target message digest 135 of the corresponding partition of target data set 115, the data present in that partition of source data set 110 is said to be modified. The data in the corresponding partition of source data set 110 is captured. Change data capture engine 145 may be used to capture the changed data from source data set 110, based upon source message digest 125. No data is transmitted from the source database server to the change data capture engine 145 during message digest calculation. Only the calculated digest values are sent. To synchronize the data in target data set 115 with the modified data in source data set 110, the data in target data set 115 is updated with the captured modified data in source data set 110. Change data capture engine 145 may be used to synchronize the data in target data set 115 with the modified data in source data set 110. For instance, change data capture engine 145 captures the modified data in the partition 2 of source data set 110. This modified data is further used to update target data set 115.

In an embodiment, partitioning the data present in the data set may be executed such that a collection of data that is not expected to change is classified and assigned to a certain partition or a certain group of partitions in source data set 110. For each iteration of comparison between source message digest 125 and target message digest 135, the data present in the partitions having a constant source message digest 125 need not be downloaded to target data set 115. To identify a modification or a deviation that has occurred to the data in source data set 110, the values of the source message digest 125 is compared with the corresponding values of the target message digest 135. Based upon the comparison, the modified data in source data set 110 is captured, and the data in target data set 115 is correspondingly updated with the captured changed data. For instance, if the value of the source message digest of a partition is different from the value of the target message digest of a corresponding partition, the data present in the partition of the source data set is said to have modified. The modified data is captured from the source data set and the corresponding partition of the target data set is updated with the captured data. The modification of data in source data set 110 may include modifying data in one or more rows of a partition, modifying a part or all of the data present in a partition, adding one or more rows to a partition, deleting one or more rows from a partition, and the like. Based upon the type of modification of data in source data set 110, target data set 115 is updated. In an embodiment, an entire partition of source data set 110 may be captured as modified data, and a corresponding entire partition of target data set 115 may be replaced with the captured partition of source data set 110. For instance, even if one row of data in a partition in source data set 110 is modified, a corresponding entire partition in target data set 115 is replaced with the modified partition that is captured form source data set 110. In another embodiment, only the modified data in a partition of source data set 110 may be captured, and a corresponding partition in target data set 115 may be updated with the modified data. For instance, only one row of data that is modified in a partition of source data set 110 is captured and a corresponding row of data in a corresponding partition of target data set 115 is updated with the captured modified data.

Figure 2:
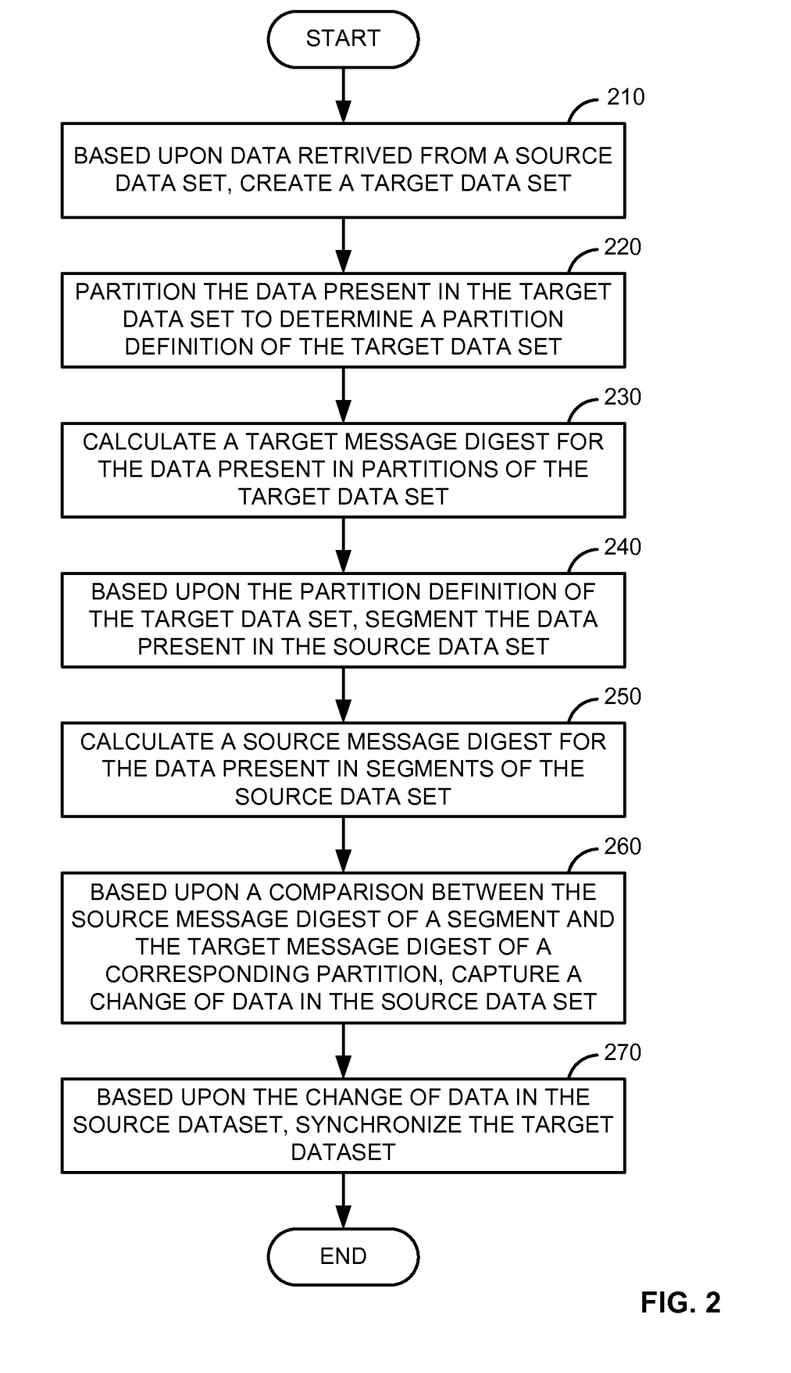
FIG. 2 is a flowchart illustrating a method for synchronizing data present in a target data set with data present in a source data set, according to one embodiment of the invention.

FIG. 2 is a flowchart illustrating a method for synchronizing data present in a target data set with data present in a source data set, according to one embodiment of the invention. In process block 210, based upon a retrieved data from the source data set, a target data set including data is created. In an embodiment, the target data set is a replica of the source data set. In process block 220, the data present in the target data set is partitioned, to determine a partition definition of the target data set. The partition definition is determined by partitioning the target data set, and determining information associated with each of the partitions. In process block 230, a target message digest is calculated for the data present in each partition of the target data set. The target message digest is a value determined for each partition of the target data set, depending upon data present in the target data set. In process block 240, based upon the partition definition of the target data set, the data present in the source data set is partitioned. In an embodiment, each of the partitions in the source data set has a corresponding partition in the target data set.

In process block 250, a source message digest is calculated for the data present in each partition of the source data set. Similar to the target message digest, the source message digest is a value determined for the data present in each partition of the source data set, depending upon the data present in the source data set. Hence, if there is any change in the data present in the partition, the source message digest of the partition correspondingly changes. In process block 260, a value of the source message digest of a partition is compared with a value of the corresponding target message digest of a partition, to identify any deviation that has occurred to the data in the source data set. Based upon the deviation identified, a change of data in the source data set is captured. The change in the data in the source data set is captured for the partition whose value of the source message digest does not match with the value of the corresponding target message digest. In process block 270, based upon the captured change of data in the source data set, the target data set is synchronized. Synchronizing the target data set with the source data set includes updating the partition of the target data set corresponding to the partition of the source data set, in which the data has changed, with the captured change of data in the source data set. Thus, the data in the target data set is synchronized with the data in the source data set.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 3:
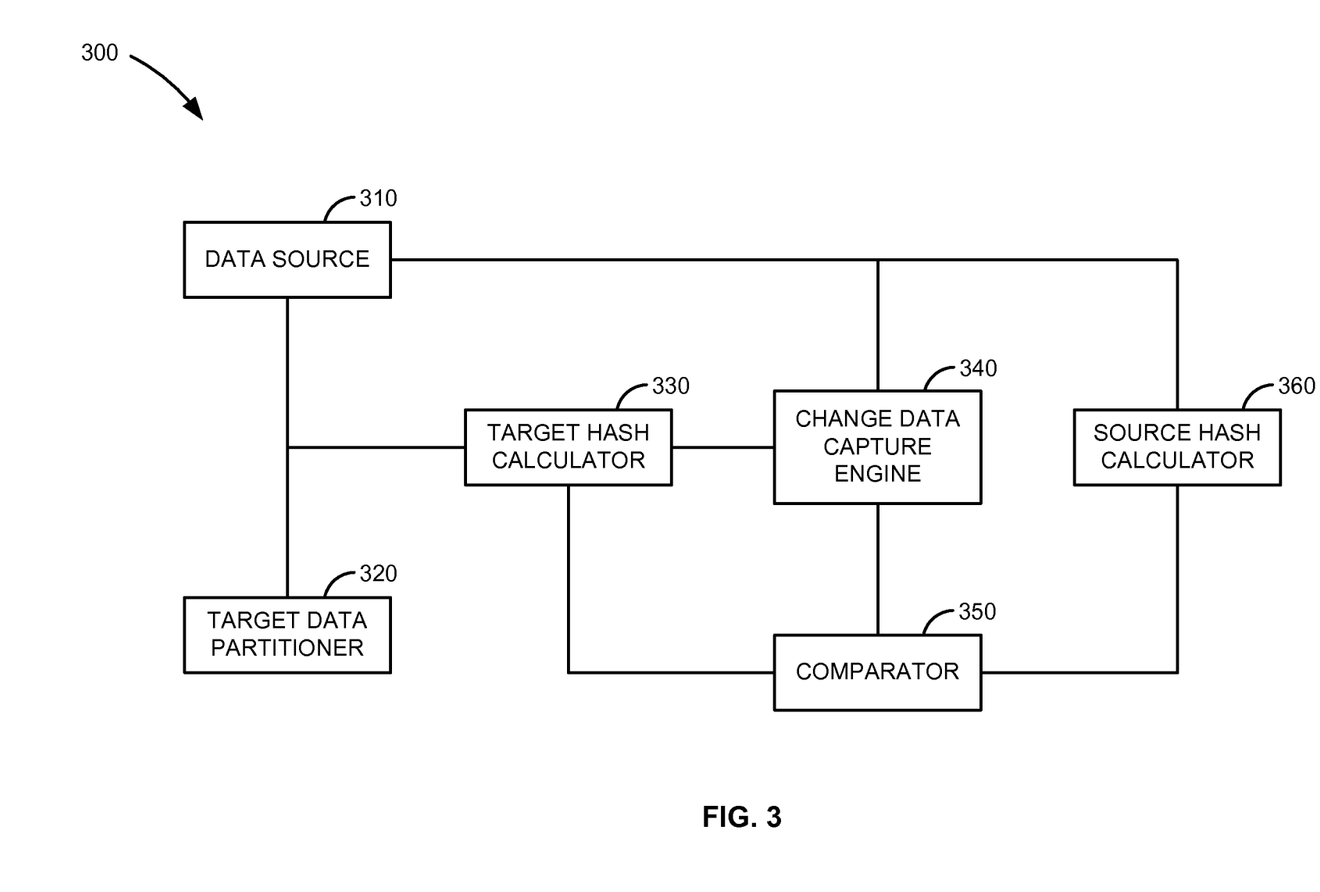
FIG. 3 is a block diagram of an exemplary computer system for synchronizing data present in a target data set with data present in a source data set, according to an embodiment of the invention.

FIG. 3 is a block diagram of an exemplary computer system 300 for synchronizing data present in a target data set with data present in a source data set, according to an embodiment of the invention. Some embodiments of the invention may include the above-described methods as being written as one or more software components. These components, and the functionality associated with them may include data source 310, target data partitioner 320, target hash calculator 330, change data capture engine 340, source hash calculator 360 and comparator 350.

Computer system 300 includes data source 310 to store the source data set and the target data set and target data partitioner 320 that determines a partition definition of the target data set, by partitioning the data present in target data set. Target hash calculator 330 calculates a target message digest for each partition of the target data set. Computer system 300 also includes change data capture engine 340 that partitions data present in the source data set based upon the partition definition of the target data set. Source hash calculator 360 calculates a source message digest for each partition of the source data set. Comparator 350 compares a value of a source message digest for a partition in the source data set with a value of a target message digest for a corresponding partition in the target data set. Any deviation in the values of the source message digest and target message digest shows a change in data in the source data set. Change data capture engine 340 captures any such change in data in the source data set. Based upon the captured data, change data capture engine 340 updates the data present in the target data set. Thus, the source data set and the target data set are synchronized.

Figure 4:
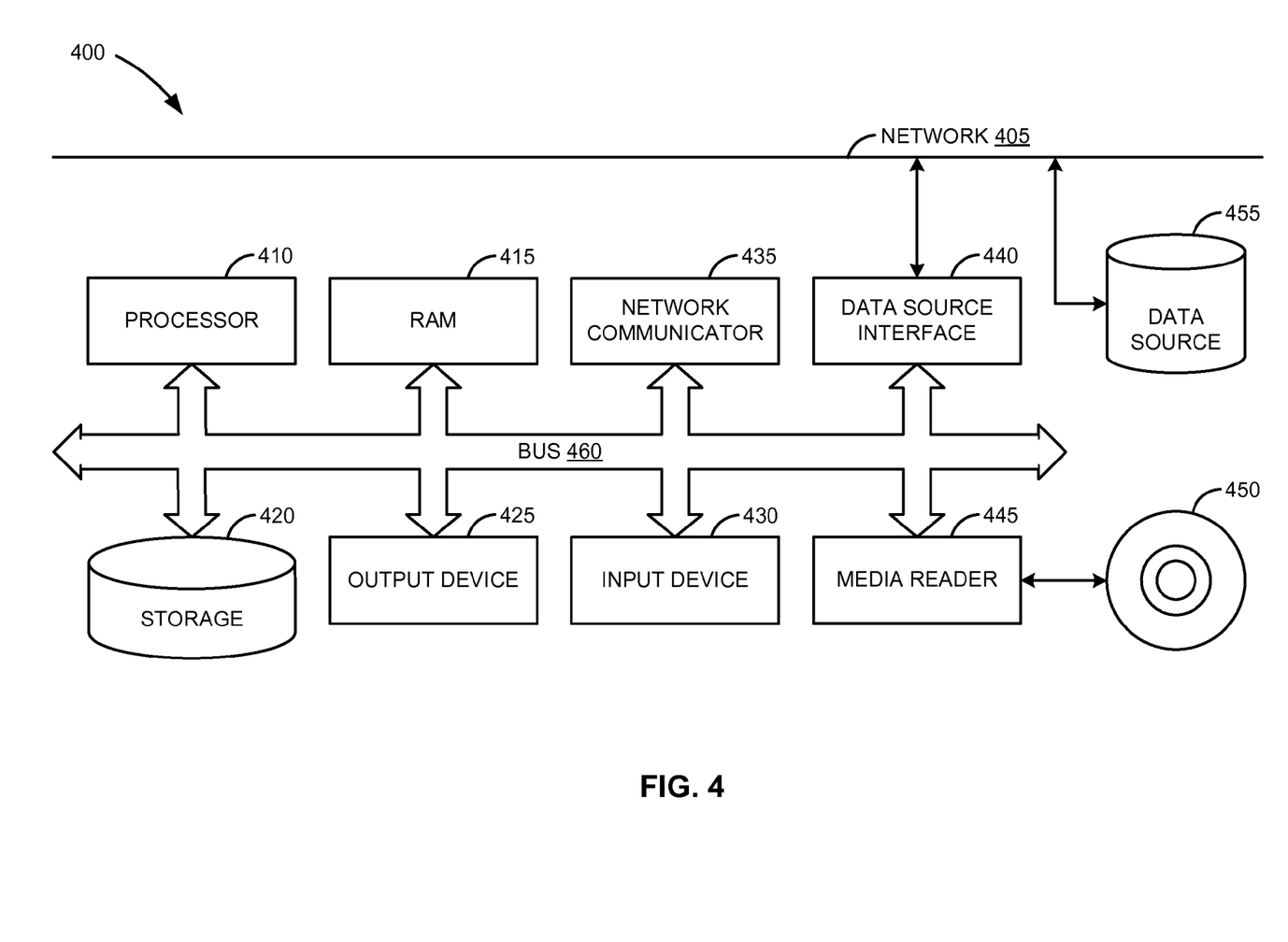
FIG. 4 is a block diagram of an exemplary computing device for synchronizing data present in a target data set with data present in a source data set, according to an embodiment of the invention.

FIG. 4 is a block diagram of an exemplary computing device 400 for synchronizing data present in a target data set with data present in a source data set, according to an embodiment of the invention. Computing device 400 includes processor 410 that executes software instructions or code stored on computer readable medium 450 to perform the above-illustrated methods of the invention. Computing device 400 includes media reader 445 to read the instructions from computer readable medium 450 and store the instructions in storage 420 or memory 415. Storage 420 provides a large space for keeping static data where at least some instructions could be stored for later execution. The stored instructions may be further compiled to generate other representations of the instructions and dynamically stored in memory 415. Processor 410 reads instructions from memory 415 and performs actions as instructed.

According to one embodiment of the invention, computing device 400 further includes output device 425 (e.g., a display) to provide at least some of the results of the execution as output including, but not limited to, visual information to users and input device 430 to provide a user or another device with means for entering data and/or otherwise interact with computing device 400. Each of these output and input devices could be joined by one or more additional peripherals to further expand the capabilities of computing device 400. Network communicator 435 may be provided to connect computing device 400 to network 405 and in turn to other devices connected to network 405 including other clients, servers, data stores, and interfaces, for instance. The modules of computing device 400 are interconnected via system bus 460. Computing device 400 includes data source interface 440 to access data source 455. Data source 455 can be accessed via one or more abstraction layers implemented in hardware or software. For example, data source 455 may be accessed by network 405. In some embodiments, data source 455 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g. text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g. ERP system), and the like. Data sources may also include a data source where the data is not tangibly stored or otherwise ephemeral such as data streams, broadcast data, and the like. These data sources can include associated data foundations, semantic layers, management systems, security systems and so on.

Data is retrieved from the source data set to create a target data set. A target data partitioner may be used to partition the data present in the target data set. The target data partitioner then determines a partition definition of the target data set. A target hash calculator utilizes a message digest algorithm that may reside in data source 455, to calculate a target message digest for the data present in each partition of the target data set. The message digest algorithm may be described as a group of instructions for calculating the message digest of each partition of the data set (for instance, source data set, target data asset). Value of each target message digest may be stored in memory 415. Based upon the partition definition of the target data set, a change data capture engine partitions the data present in the source data set. A source hash calculator utilizes the message digest algorithm that resides in data source 455, to calculate a source message digest for the data present in each partition of the target data set. A comparator may be utilized to compare the value of the source message digest of a partition of the source data set with the value of the target message digest of a corresponding partition of the target data set. Any deviation in the values of the source message digest and target message digest shows a change in data in the source data set. The change data capture engine captures any such change in data in the source data set. Based upon the captured data, the change data capture engine updates the data present in the target data set. Thus, the source data set and the target data set are synchronized.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

We claim:

1. An article of manufacture, comprising a computer readable medium comprising instructions that, when executed by a computer, cause the computer to execute a method for synchronizing data present in a target data set with data present in a source data set, the method comprising:
   partitioning the data present in the target data set to determine a partition definition of the target data set, the partition definition including information about the data present in each partition of the target data set;
   calculating a target message digest for the data present in each partition of the target data set;
   based upon the partition definition of the target data set, partitioning the data present in the source data set;
   calculating a source message digest for the data present in each partition of the source data set;
   based upon a change of data and a degree of change of the data in the source data set, repartitioning one or more partitions associated with the change of data in the source data set and recalculating corresponding one or more source message digest for the repartitioned partitions;
   comparing the source message digest of a partition of the source data set and the target message digest of a corresponding partition of the target data set to determine a deviation between the source message digest and the target message digest; and
   based upon the deviation, capturing the change of data in the source data set and synchronizing the target data set with the source data set by
      repartitioning one or more partitions of the target data set based upon the repartitioning of the source data set and
      updating the corresponding partition of the target data set with the captured change of data.

2. The article of manufacture of claim 1, wherein the information about the data present in each partition of the target data set comprises partitioning information of the corresponding partition.

3. The article of manufacture of claim 1, wherein the method further comprises creating the target data set by:
   retrieving metadata of the data present in the source data set;
   creating the target data set based upon the metadata of the source data set; and replicating the data present in the source data set to the target data set.

4. The article of manufacture of claim 1, wherein calculating the target message digest for the data present in the target data set comprises calculating a value of the target message digest for each partition of the target data set.

5. The article of manufacture of claim 4 further comprises updating the value of the message digest based upon a change in data of the source data set.

6. The article of manufacture of claim 1, wherein the comparison of the source message digest of the partition of the source data set and the target message digest of the corresponding partition of the target data set comprises:
   comparing a value of the source message digest of the partition of the source data set with a value of the target message digest of the corresponding partition of the target data set;
   based upon a deviation in the value of the source message digest, capturing modified data from the partition of the source data set; and
   updating the corresponding partition of the target data set with the modified data captured from the partition of the source data set.

7. The article of manufacture of claim 6, wherein the change of data is determined based upon a difference in the value of the source message digest of a partition and the value of the target message digest of a corresponding partition.

8. The article of manufacture of claim 1, wherein the method further comprises fragmenting the partition definition of the target data set, based upon a degree of modification.

9. The article of manufacture of claim 1, wherein the method further comprises consolidating the partition definition of the target data set, based upon a degree of modification.

10. A computing device to synchronize data present in a target data set with data present in a source data set comprising:
   a processor to read and execute instructions stored in one or more memory elements; and
   the one or more memory elements storing instructions related to: a
   data partitioner to partition the data present in the target data set to determine a partition definition of the target data set and to partition the data present in the source data set;
   a hash calculator in communication with the data partitioner, to utilize a message digest algorithm to calculate a target message digest for the data present in one or more partitions of the target data set and to calculate a source message digest for the data present in one or more partitions of the source data set;
   a comparator in communication with the hash calculator, to compare the source message digest of at least one of the partitions of the source data set and the target message digest of a corresponding partition of the target data set; and
   a change data capture engine in communication with the comparator and the data partitioner,
      to repartition one or more partitions associated with the change of data in the source data set based upon a degree of modification and recalculate corresponding one or more source message digest for the repartitioned partitions,
      to determine a deviation between the source message digest and the target message digest based upon a comparison of the source message digest of a partition of the source data set and the target message digest of a corresponding partition of the target data set executed by the comparator, and to capture the change of data in the source data set based upon the deviation and to synchronize the target data set based upon the change of data in the source data set by repartitioning one or more partitions of the target data set based upon the repartitioning of the source data set and updating the corresponding partition of the target data set with the captured change of data.

11. The computing device of claim 10, further comprising a database storing the source data set and the target data set.

12. The computing device of claim 11, wherein the database stores the partition definition of the target data set and the target message digest.

13. The computing device of claim 10 further comprising a data set creator for creating the target data set by retrieving data from the source data set, the source data set including metadata associated with the source data set and replicating the data present in the source data set as the target data set in a target database.

14. The computing device of claim 10, wherein the hash calculator calculates the target message digest for the data present in the partitions of the target data set by calculating a value for data present in partitions of the target data set.

15. The computing device of claim 10, wherein the change data capture engine updates the value of the target message digest based upon a change in data of the target data set.

16. The computing device of claim 10, wherein the comparator compares the source message digest for the partition of the source data set and the target message digest for the partition of the target data set by comparing a value of the source message digest with a value of the target message digest.

17. The computing device of claim 10, wherein the change data capture engine captures modified data in the source data set, based upon a deviation in a value of the source message digest for a partition of the source data set, and updates a corresponding partition of the target data set with the modified data.

18. The computing device of claim 10, wherein the data partitioner fragments the partition definition of the target data set, or consolidates the partition definition of the target data set based upon a degree of modification.

19. A computer implemented method for synchronizing data present in a target data set with data present in a source data set, the method comprising:

partitioning the data present in the target data set to determine a partition definition of the target data set, the partition definition including information about the data present in each partition of the target data set;

calculating a target message digest for the data present in one or more partitions of the target data set;

based upon the partition definition of the target data set, partitioning the data present in the source data set;

calculating a source message digest for the data present in one or more partitions of the source data set;

based upon a change of data and a degree of change of the data in the source data set, repartitioning one or more partitions associated with the change of data in the source data set and recalculating corresponding one or more source message digest for the repartitioned partitions;

comparing the source message digest of a partition of the source data set and the target message digest of a corresponding partition of the target data set to determine a deviation between the source message digest and the target message digest;

and based upon the deviation, capturing the change of data in the source data set and synchronizing the target data set with the source data set by repartitioning one or more partitions of the target data set based upon the repartitioning of the source data set and updating the corresponding partition of the target data set with the captured change of data.

20. A computer implemented method of claim 19 further comprising creating the target data set by:

retrieving metadata of the data preset in the source data set;

creating the target data set based upon the metadata of the source data set; and replicating the data present in the source data set to the target data set.

* * * * *